US007054462B2

(12) United States Patent
Rhoads et al.

(10) Patent No.: US 7,054,462 B2
(45) Date of Patent: *May 30, 2006

(54) INFERRING OBJECT STATUS BASED ON DETECTED WATERMARK DATA

(75) Inventors: Geoffrey B. Rhoads, West Linn, OR (US); Ammon E. Gustafson, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 231 days.

This patent is subject to a terminal disclaimer.

(21) Appl. No.: 10/112,647

(22) Filed: Mar. 28, 2002

(65) Prior Publication Data

US 2002/0159615 A1 Oct. 31, 2002

Related U.S. Application Data

(60) Continuation-in-part of application No. 09/998,763, filed on Nov. 29, 2001, now Pat. No. 6,738,495, which is a division of application No. 09/498,223, filed on Feb. 3, 2000, now Pat. No. 6,574,350, which is a continuation-in-part of application No. 09/287,940, filed on Apr. 7, 1999, now Pat. No. 6,580,819, which is a continuation of application No. 09/433,104, filed on Nov. 3, 1999, now Pat. No. 6,636,615, which is a continuation-in-part of application No. 09/234,780, filed on Jan. 20, 1999, now abandoned, which is a continuation-in-part of application No. 09/442,440, filed on Nov. 17, 1999, now Pat. No. 6,542,618, which is a continuation of application No. 08/951,858, filed on Oct. 16, 1997, now Pat. No. 6,026,193, which is a continuation of application No. 08/436,134, filed on May 8, 1995, now Pat. No. 5,748,763.

(60) Provisional application No. 60/082,228, filed on Apr. 16, 1998, provisional application No. 60/071,983, filed on Jan. 20, 1998.

(51) Int. Cl.
*G06K 9/00* (2006.01)

(52) U.S. Cl. ..................................... 382/100; 358/328
(58) Field of Classification Search ................ 382/100, 382/232, 254; 235/494; 312/100; 345/634; 358/3.28; 380/202, 203, 205, 210, 34, 54; 705/50, 60; 713/176; 715/517
See application file for complete search history.

(56) References Cited

U.S. PATENT DOCUMENTS

| 4,238,849 A | 12/1980 | Gassmann |
| 4,689,477 A | 8/1987 | Goldman |
| 4,723,072 A | 2/1988 | Naruse |
| 5,228,056 A | 7/1993 | Schilling |

(Continued)

FOREIGN PATENT DOCUMENTS

DE 29 43 436 5/1981

(Continued)

OTHER PUBLICATIONS

Chow et al., "Forgery and Tamper-Proof Identification Document," IEEE Proc. 1993 Int. Carnahan Conf. on Security Technology, Oct. 13-15, 1993, pp. 11-14.

(Continued)

*Primary Examiner*—Yon J. Couso
(74) *Attorney, Agent, or Firm*—Digimarc Corporation (57) ABSTRACT

Image, video, or audio data is encoded with both a frail and a robust watermark. The two watermarks respond differently to different forms of processing (e.g., copying the object may render the frail watermark unreadable), permitting an original object to be distinguished from a processed object. Appropriate action can then taken in response thereto.

30 Claims, 3 Drawing Sheets

U.S. PATENT DOCUMENTS

| | | |
|---|---|---|
| 5,237,164 A | 8/1993 | Takada |
| 5,284,364 A | 2/1994 | Jain |
| 5,337,361 A | 8/1994 | Wang et al. |
| 5,354,097 A | 10/1994 | Tel |
| 5,384,846 A | 1/1995 | Berson et al. |
| 5,436,970 A | 7/1995 | Ray et al. |
| 5,450,490 A | 9/1995 | Jensen |
| 5,471,533 A | 11/1995 | Wang et al. |
| 5,490,217 A | 2/1996 | Wang et al. |
| 5,502,576 A * | 3/1996 | Ramsay et al. ............. 358/444 |
| 5,510,900 A | 4/1996 | Shirochi |
| 5,646,997 A | 7/1997 | Barton |
| 5,652,626 A | 7/1997 | Kawakami |
| 5,659,726 A | 8/1997 | Sandford, II et al. |
| 5,664,018 A * | 9/1997 | Leighton ..................... 380/54 |
| 5,694,471 A | 12/1997 | Chen et al. |
| 5,748,763 A | 5/1998 | Rhoads |
| 5,751,854 A | 5/1998 | Saitoh et al. |
| 5,799,092 A | 8/1998 | Kristol et al. |
| 5,822,436 A | 10/1998 | Rhoads |
| 5,841,886 A | 11/1998 | Rhoads |
| 5,857,038 A | 1/1999 | Owada |
| 5,864,622 A | 1/1999 | Marcus |
| 5,892,900 A | 4/1999 | Ginter et al. |
| 5,901,224 A * | 5/1999 | Hecht ......................... 713/179 |
| 5,905,800 A | 5/1999 | Moskowitz et al. |
| 5,907,149 A | 5/1999 | Marckini |
| 5,912,974 A | 6/1999 | Holloway et al. |
| 5,943,422 A | 8/1999 | Van Wie et al. |
| 5,949,885 A * | 9/1999 | Leighton ..................... 380/54 |
| 5,951,055 A | 9/1999 | Mowry, Jr. |
| 5,974,548 A * | 10/1999 | Adams ....................... 713/200 |
| 6,024,287 A | 2/2000 | Takai |
| 6,026,193 A | 2/2000 | Rhoads |
| 6,061,793 A * | 5/2000 | Tewfik et al. ................ 713/176 |
| 6,065,119 A | 5/2000 | Sandford, II et al. |
| 6,104,812 A | 8/2000 | Koltai et al. |
| 6,185,683 B1 | 2/2001 | Ginter et al. |
| 6,226,387 B1 | 5/2001 | Tewfik et al. |
| 6,233,347 B1 | 5/2001 | Chen et al. |
| 6,233,684 B1 | 5/2001 | Stefik et al. |
| 6,237,786 B1 | 5/2001 | Ginter et al. |
| 6,240,121 B1 | 5/2001 | Senoh |
| 6,243,480 B1 | 6/2001 | Zhao |
| 6,246,775 B1 | 6/2001 | Nakamura et al. |
| 6,246,777 B1 | 6/2001 | Agarwal et al. |
| 6,272,176 B1 | 8/2001 | Srinivasan |
| 6,272,634 B1* | 8/2001 | Tewfik et al. ................ 713/176 |
| 6,275,599 B1 | 8/2001 | Adler et al. |
| 6,278,792 B1 | 8/2001 | Cox |
| 6,285,775 B1 | 9/2001 | Wu et al. |
| 6,285,776 B1 | 9/2001 | Rhoads |
| 6,289,108 B1 | 9/2001 | Rhoads |
| 6,292,092 B1 | 9/2001 | Chow et al. |
| 6,314,192 B1 | 11/2001 | Chen et al. |
| 6,314,457 B1 | 11/2001 | Schena et al. |
| 6,332,031 B1 | 12/2001 | Rhoads et al. |
| 6,332,194 B1 | 12/2001 | Bloom et al. |
| 6,334,187 B1 | 12/2001 | Kadono |
| 6,343,138 B1 | 1/2002 | Rhoads |
| 6,374,036 B1 | 4/2002 | Ryan |
| 6,389,151 B1 | 5/2002 | Carr |
| 6,398,245 B1 | 6/2002 | Gruse et al. |
| 6,418,232 B1 | 7/2002 | Nakano et al. |
| 6,425,081 B1 | 7/2002 | Iwamura |
| 6,427,012 B1 | 7/2002 | Petrovic |
| 6,427,020 B1 | 7/2002 | Rhoads |
| 6,427,140 B1 | 7/2002 | Ginter et al. |
| 6,439,465 B1 | 8/2002 | Bloomberg |
| 6,456,726 B1 | 9/2002 | Yu et al. |
| 6,487,301 B1 | 11/2002 | Zhao |
| 6,512,837 B1 | 1/2003 | Ahmed |
| 6,542,618 B1 | 4/2003 | Rhoads |
| 6,574,350 B1 | 6/2003 | Rhoads |
| 6,577,746 B1 | 6/2003 | Evans et al. |
| 6,580,819 B1 | 6/2003 | Rhoads |
| 6,625,295 B1* | 9/2003 | Wolfgang et al. ........... 382/100 |
| 6,636,615 B1 | 10/2003 | Rhoads et al. |
| 6,728,390 B1 | 4/2004 | Rhoads |
| 6,744,906 B1 | 6/2004 | Rhoads |
| 2001/0008557 A1 | 7/2001 | Stefik et al. |
| 2001/0020270 A1 | 9/2001 | Yeung et al. |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028725 A1 | 10/2001 | Nakagawa et al. |
| 2001/0028727 A1 | 10/2001 | Naito et al. |
| 2001/0047478 A1 | 11/2001 | Mase |
| 2001/0051996 A1 | 12/2001 | Cooper et al. |
| 2001/0052076 A1 | 12/2001 | Kadono |
| 2001/0053235 A1 | 12/2001 | Sato |
| 2001/0054144 A1 | 12/2001 | Epstein et al. |
| 2002/0010684 A1 | 1/2002 | Moskowitz |
| 2002/0015509 A1 | 2/2002 | Nakamura |
| 2002/0023148 A1 | 2/2002 | Ritz et al. |
| 2002/0033844 A1 | 3/2002 | Levy et al. |
| 2002/0037091 A1 | 3/2002 | Terasaki |
| 2002/0037093 A1 | 3/2002 | Murphy |
| 2002/0061121 A1 | 5/2002 | Rhoads et al. |
| 2002/0061122 A1 | 5/2002 | Fujihara et al. |
| 2002/0062442 A1 | 5/2002 | Kurahash |
| 2002/0064298 A1 | 5/2002 | Rhoads et al. |
| 2002/0064759 A1 | 5/2002 | Durbin et al. |
| 2002/0067914 A1 | 6/2002 | Schumann et al. |
| 2002/0068987 A1 | 6/2002 | Hars |
| 2002/0071556 A1 | 6/2002 | Moskowitz et al. |
| 2002/0073317 A1 | 6/2002 | Hars |
| 2002/0080396 A1 | 6/2002 | Silverbrook et al. |
| 2002/0095577 A1 | 7/2002 | Nakamura et al. |
| 2002/0097873 A1 | 7/2002 | Petrovic |
| 2002/0097891 A1 | 7/2002 | Hinishi |
| 2002/0105679 A1 | 8/2002 | Haynes |
| 2002/0106192 A1 | 8/2002 | Sako |
| 2002/0112171 A1 | 8/2002 | Ginter et al. |
| 2002/0114458 A1 | 8/2002 | Belenko et al. |
| 2002/0122568 A1 | 9/2002 | Zhao |
| 2002/0176114 A1 | 11/2002 | Zeller et al. |
| 2003/0009669 A1 | 1/2003 | White |
| 2003/0128860 A1 | 7/2003 | Braudaway et al. |

FOREIGN PATENT DOCUMENTS

| | | |
|---|---|---|
| EP | 629 972 | 12/1994 |
| EP | 975 147 | 1/2000 |
| EP | 1041815 | 10/2000 |
| EP | 1077570 | 2/2001 |
| EP | 1202250 | 5/2002 |
| EP | 1209897 | 5/2002 |
| GB | 2346110 | 8/2000 |
| JP | 3-185585 | 8/1991 |
| WO | WO95/13597 | 5/1995 |
| WO | WO9820411 | 5/1998 |
| WO | WO0105075 | 1/2001 |
| WO | WO0139121 | 5/2001 |
| WO | WO0173997 | 10/2001 |
| WO | WO0176253 | 10/2001 |
| WO | WO0197128 | 12/2001 |
| WO | WO0197175 | 12/2001 |
| WO | WO0207425 | 1/2002 |
| WO | WO0207442 | 1/2002 |
| WO | WO0217631 | 2/2002 |
| WO | WO0219589 | 3/2002 |
| WO | WO0225599 | 3/2002 |
| WO | WO0237309 | 5/2002 |

| | | |
|---|---|---|
| WO | WO0256264 | 7/2002 |
| WO | WO02/098670 | 12/2002 |

OTHER PUBLICATIONS

Dittmann, J., "Chapter 3: Telltale Watermarking," in Multiresolution Digital Watermarking: Algorithms and Implications for Multimedia Signals, Ph.D. thesis at Univ. of Toronto, 1999, pp. 23-52.

Dittmann, J. et al., "Content-based Digital Signature for Motion Pictures Authentication and Content-Fragile Watermarking," IEEE Proc. Int. Conf. on Multimedia Computing and Systems, Jun. 1999, pp. 209-213.

EMI "Screening Content from Compact Discs: ID Trac," SDMII Jun. 3, 1999, 13 pages.

Kawaguchi et al., "Principle and Applications of BPCS-Steganography," Proc. SPIE vol. 3528: Multimedia Systems and Applications, Nov. 2-4, 1998, pp. 464-473.

Komatsu et al., "Authentication System Using Concealed Image in Telematics," Memoirs of the School of Science & Engineering, Waseda Univ., No. 52, 1988, pp. 45-60.

Komatsu et al., "A Proposal on Digital Watermarking in Document Image Communications and Its Application to Realizing a Signature," Electronics and Communications in Japan, Part 1, vol., 73, No. 5, 1990, pp. 22-23.

Kundur et al., "A Robust Digital Image Watermarking Method Using Wavelet-Based Fusion," IEEE Jul. 1997, pp. 544-547.

Lamy, P. et al., "Content-Based Watermarking for Image Authentication," Proc. 3.sup.rd Int. Workshop on Information Hiding, Sep./Oct. 1999, pp. 187-198.

Lin, C.-Y. et al., "Generating Robust Digital Signature for Image/Video Authentication," Proc. Multimedia and Security Workshop at ACM Multimedia 98, Sep. 1998, pp. 49-54.

Lin, C.-Y. et al., "Issues and Solutions for Authenticating MPEG Video," Proc. SPIE vol. 3657: Security and Watermarking of Multimedia Contents, Jan. 1999, pp. 54-65.

F. Mintzer and G. Braudaway, "If one watermark is good, are more better?," Proceedings of the International Conference on Accoustics, Speech, and Signal Processing, vol. 4, Phoenix, Arizona, May 1999.

Schneider, M., "A Robust Content Based Digital Signature for Image Authentication," IEEE Proc. Int. Conf. on Image Processing, Sep. 1996, pp. 227-230 (vol. 3).

Seybold Report on Desktop Publishing, "Holographic Signatures for Digital Images," Aug., 1995, 1 page.

Sharma et al., "Practical Challenges For Digital Watermarking Applications", May 3, 2001, pp. 1-10.

Xie, L. et al., "Secure MPEG Video Communications by Watermarking," Proc. Conf. of ATIRP (Advanced Telecommunications and Information Distribution Research Project), Feb. 1999, pp. 459-462.

Yeung et al., "Digital Watermarks: Shedding Light on the Invisible," Nov.-Dec. 1998, IEEE Micro vol. 18, No. 6, pp. 32-41.

* cited by examiner

INFERRING OBJECT STATUS BASED ON DETECTED WATERMARK DATA

This application is a divisional of application Ser. No. 09/498,223, filed Feb. 3, 2000 (now U.S. Pat. No. 6,574, 350). The Ser. No. 09/498,223 application is a continuation-in-part of application Ser. No. 09/287,940, filed Apr. 7, 1999 (now U.S. Pat. No. 6,580,819), which claims priority to abandoned application 60/082,228, filed Apr. 16, 1998. The Ser. No. 09/498,223 application is also a continuation of application Ser. No. 09/433,104, filed Nov. 3, 1999 (now U.S. Pat. No. 6,636,615), which is a continuation-in-part of application Ser. No. 09/234,780, filed Jan. 20, 1999 (now abandoned), which claims priority to abandoned application 60/071,983, filed Jan. 20, 1998. The above patent documents are incorporated herein by reference. The Ser. No. 09/433,104 application is a continuation in part of application Ser. No. 09/442,440, filed Nov. 17. 1999 (now U.S. Pat. No. 6,542,618), which is a continuation of application Ser. No. 08/951,858, filed Oct. 16, 1997 (now U.S. Pat. No. 6,026,193), which is a continuation of application Ser. No. 08/436,134, filed May 8, 1995 (now U.S. Pat. No. 5,748,763). Priority is claimed to these applications as well.

FIELD OF THE INVENTION

The present application relates to digital watermarking, and particularly relates to digital watermarking techniques employing both frail and robust watermarks.

BACKGROUND AND SUMMARY OF THE INVENTION

For expository convenience, the following discussion focuses on an exemplary application of the disclosed technology—encoding the images printed on banknotes with both frail and robust watermarks. As noted later, however, the technology also finds application beyond image watermarking, including in video and audio watermarking.

The problem of casual counterfeiting of banknotes first arose two decades ago, with the introduction of color photocopiers. A number of techniques were proposed to address the problem.

U.S. Pat. No. 5,659,628 (assigned to Ricoh) is one of several patents noting that photocopiers can be equipped to recognize banknotes and prevent their photocopying. The Ricoh patent particularly proposed that the red seal printed on Japanese yen notes is a pattern well-suited for machine recognition. U.S. Pat. No. 5,845,008 (assigned to Omron), and U.S. Pat. No. 5,724,154 and 5,731,880 (both assigned to Canon) show other photocopiers that sense the presence of the seal emblem on banknotes, and disable a photocopier in response.

Other technologies proposed that counterfeiting might be deterred by uniquely marking the printed output from each color photocopier, so that copies could be traced back to the originating machine. U.S. Pat. No. 5,568,268, for example, discloses the addition of essentially-imperceptible patterns of yellow dots to printed output; the pattern is unique to the machine. U.S. Pat. No. 5,557,742 discloses a related arrangement in which the photocopier's serial number is printed on output documents, again in essentially-imperceptible form (small yellow lettering). U.S. Pat. No. 5,661,574 shows an arrangement in which bits comprising the photocopier's serial number are represented in the photocopier's printed output by incrementing, or decrementing, pixel values (e.g. yellow pixels) at known locations by fixed amounts (e.g. +/−30), depending on whether the corresponding serial number bit is a "1" or a "0."

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink-jet printers are commonly available from Hewlett-Packard Co., Epson, etc. for under $300.

These tools pose new threats. For example, a banknote can be doctored (e.g. by white-out, scissors, or less crude techniques) to remove/obliterate the visible patterns on which prior art banknote detection techniques relied to prevent counterfeiting. Such a doctored document can then be freely scanned or copied, even on photocopiers designed to prevent processing of banknote images. The removed pattern(s) can then be added back in, e.g. by use of digital image editing tools, permitting free reproduction of the banknote.

In accordance with aspects of the present invention, these and other current threats are addressed by digitally watermarking banknotes, and equipping devices to sense such watermarks and respond accordingly. (Watermarking is a quickly growing field of endeavor, with several different approaches. The present assignee's work is reflected in the earlier-cited related applications, as well as in U.S. Pat. Nos. 5,841,978, 5,748,783, 5,710,834, 5,636,292, 5,721,788, and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.)

In accordance with an exemplary embodiment of the present invention, an object—such as a banknote image—is encoded with two watermarks. One is relatively robust, and withstands various types of corruption, and is detectable in the object even after multiple generations of intervening distortion. The other is relatively frail, so that it fails with the first distortion. If a version of the object is encountered having the robust watermark but not the frail watermark, the object can be inferred to have been processed, and thus not an original.

The foregoing and other features and advantages of the present invention will be more readily apparent from the following Detailed Description, which proceeds with reference to the accompanying drawings.

DETAILED DESCRIPTION

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication.

Figure 1:
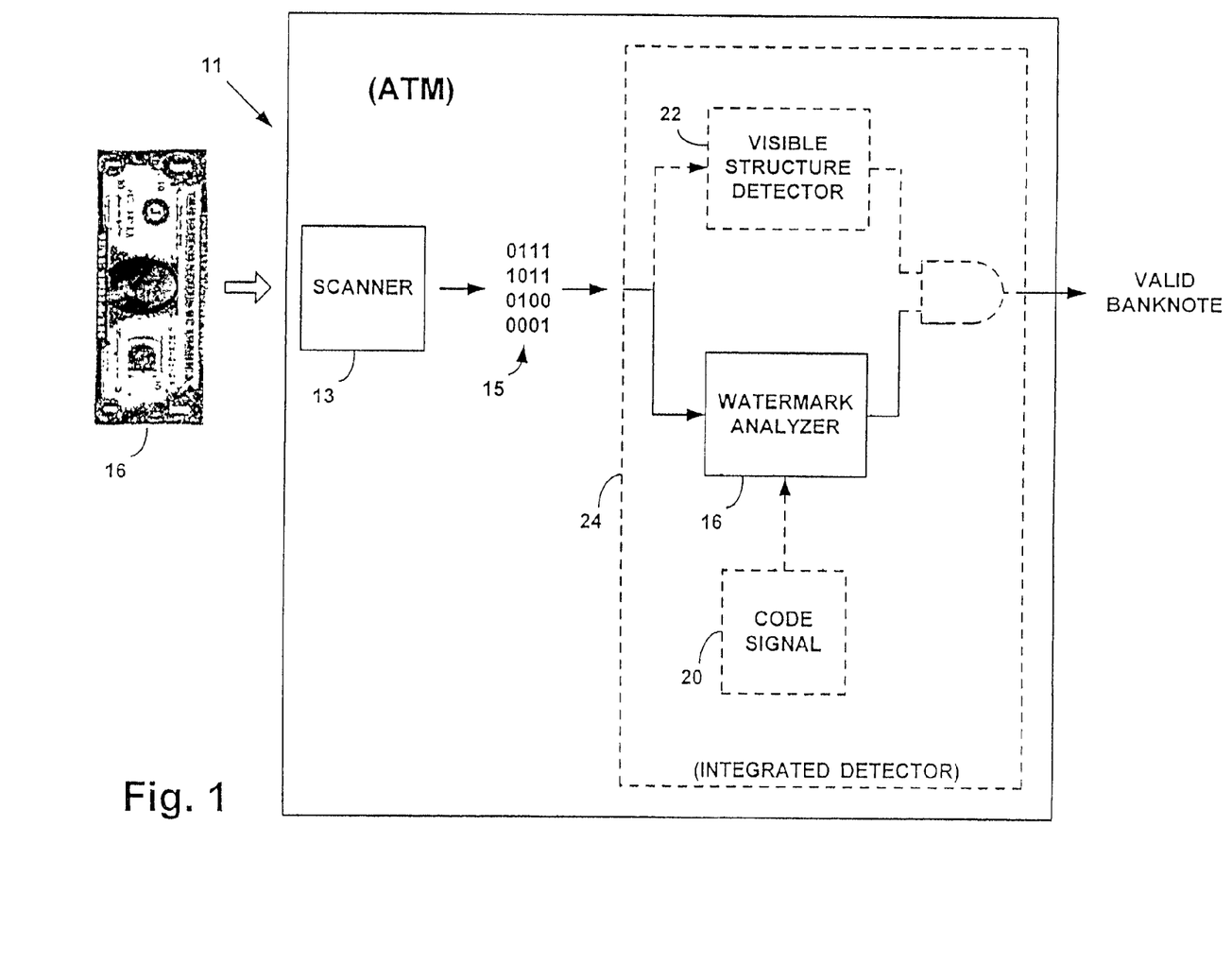
FIG. 1 shows part of an automatic teller machine employing principles of the present invention.

By way of example, consider an automatic teller machine that uses watermark data to provide high confidence authentication of banknotes, permitting it to accept—as well as dispense—cash. Referring to FIG. 1, such a machine (11) is provided with a known optical scanner (13) to produce digital data (15) corresponding to the face(s) of the bill (16). This image set (14) is then analyzed (16) to extract embedded watermark data. In watermarking technologies that require knowledge of a code signal (20) for decoding (e.g. noise modulation signal, crypto key, spreading signal, etc.), a bill may be watermarked in accordance with several such codes. Some of these codes are public—permitting their reading by conventional machines. Others are private, and are reserved for use by government agencies and the like. (C.f. public and private codes in the present assignee's issued patents.)

As noted, banknotes presently include certain visible structures, or markings (e.g., the seal emblem noted in the earlier-cited patents), which can be used as aids to note authentication (either by visual inspection or by machine detection). Desirably, a note is examined by an integrated detection system (24), for both such visible structures (22), as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

Figure 2:
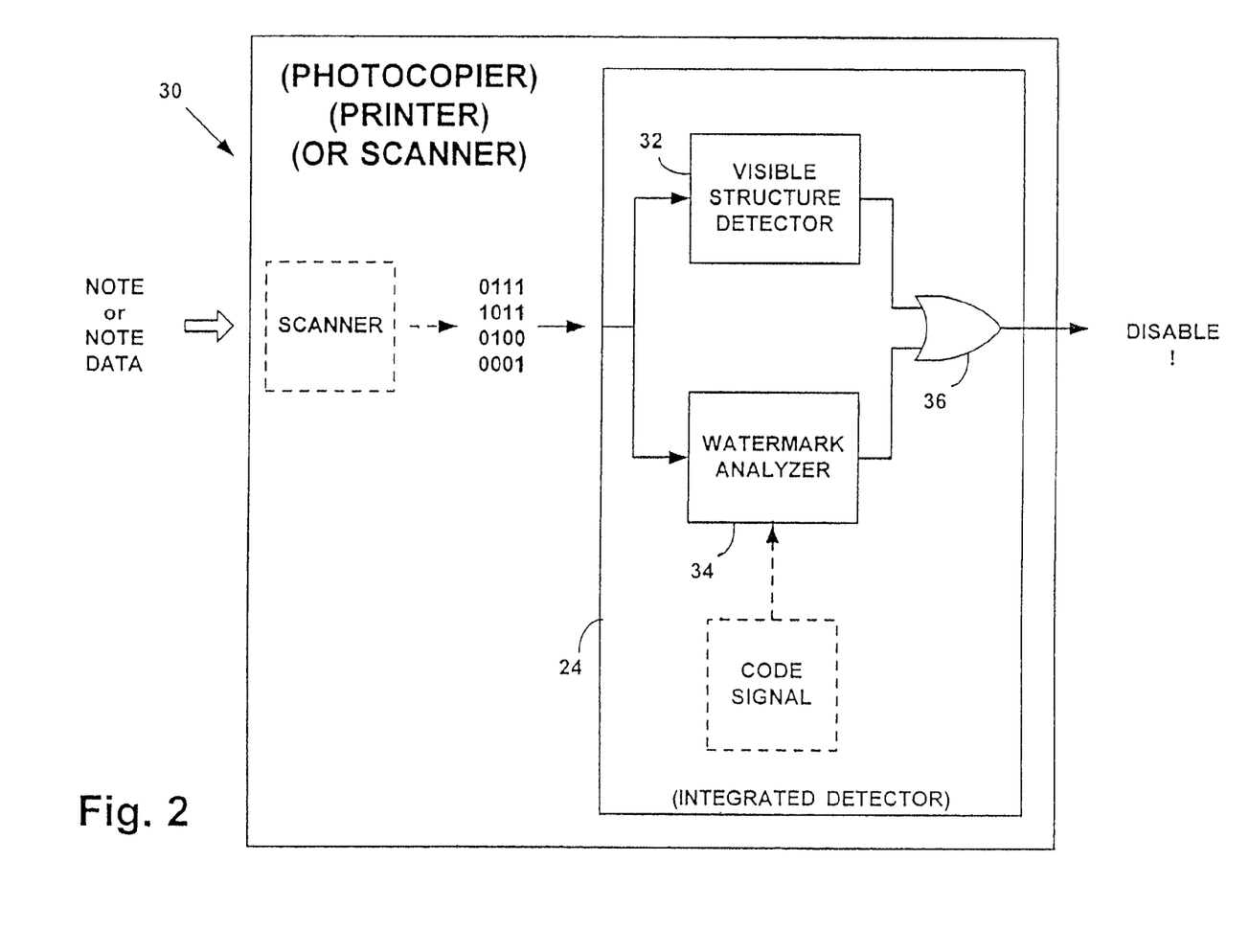
FIG. 2 shows part of a device (e.g. a photocopier, scanner, or printer) employing principles of the present invention.

To reduce counterfeiting, it is desirable that document-reproducing technologies recognize banknotes and refuse to reproduce same. Referring to FIG. 2, a photocopier (30), for example, can sense the presence of either a visible structure (32) or embedded banknote watermark data (34), and disable copying if either is present (36). Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. As noted, an original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

Figure 3:
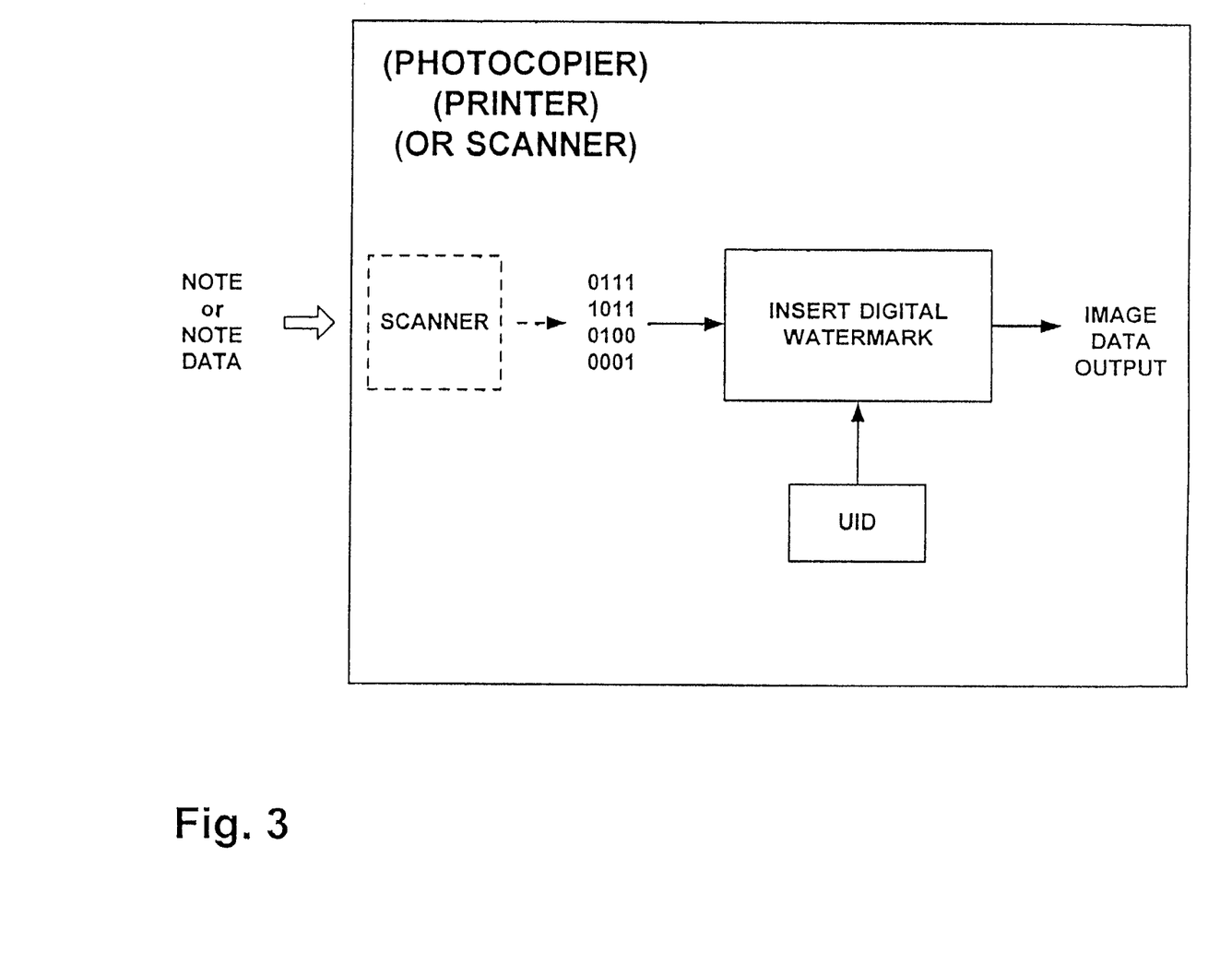
FIG. 3 shows part of another device employing principles of the present invention.

A related principle (FIG. 3) is to insert an imperceptible watermark having a universal ID (UID) into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of either a visible structure or watermarked data, in other applications, both criteria must be met before a banknote is recognized as genuine. Such applications typically involve the receipt or acceptance of banknotes, e.g. by ATMs as discussed above and illustrated in FIG. 1.

The foregoing principles (employing just watermark data, or in conjunction with visible indicia) can likewise be used to prevent counterfeiting of tags and labels (e.g. the fake labels and tags commonly used in pirating Levis brand jeans, branded software, etc.)

The reader may first assume that banknote watermarking is effected by slight alterations to the ink color/density/ distribution, etc. on the paper. This is one approach. Another is to watermark the underlying medium (whether paper, polymer, etc.) with a watermark. This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.)

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected.)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multi-bit watermarking, technology described as using imperceptible watermarks can alternatively be practiced using visible watermarks (glyphs, etc.), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

We claim:

1. A method to analyze an object, wherein an original or authentic object includes both a first watermark and a second different watermark, said method comprising:
    attempting to detect first and second watermarks from an object;
    if the first and second watermarks are both detected, reaching a first conclusion concerning the object; and
    if the first watermark is detected but not the second, reaching a second, different, conclusion concerning the object.

2. The method of claim 1, wherein the watermarking of at least the first watermark is effected by slight alterations to the object's color.

3. The method of claim 2, in which the first watermark is designed to withstand a predetermined process, and the second watermark is not, wherein the predetermined process comprises at least scanning and reprinting.

4. A method comprising:
    receiving a set of sampled data, wherein original or authentic data comprises a plurality of different watermarks;

analyzing said set of sampled data for watermark information, wherein the watermark information comprises first watermark information and second watermark information; and based on a result of said analysis, concluding that the sampled data does not correspond to an original.

5. The method of claim 4, wherein the first watermark information is designed to withstand a predetermined process, and the second watermark information is not.

6. The meted of claim 5, wherein the predetermined process includes scanning and printing.

7. The method of claim 6, wherein the watermarking of the first watermark is effected by slight alterations to the sampled data's color.

8. The method of claim 1, wherein the object comprises a document.

9. The method of claim 1, wherein reaching a first conclusion concerning the object comprises determining that the object comprises an original or authentic object.

10. The method of claim 9, wherein the second, different, conclusion concerning the object comprises determining that the object is not an original or authentic object.

11. A security document comprising:
a substrate;
printing on the substrate, wherein the printing comprises at least a first digital watermark and a second digital watermark, and
wherein the first digital watermark and the second digital watermark cooperate to yield an authentication clue concerning the security document.

12. The security document of claim 11, wherein the first digital watermark is designed to withstand a predetermined process, and the second digital watermark is not, and wherein the predetermined process comprises at least one of scanning and printing.

13. A method comprising;
attempting to detect first and second watermarks from an object, wherein the first watermark is designed to withstand a predetermined process, and the second watermark is not, and wherein the predetermined process comprises at least one of scanning and reprinting;
if the first and second watermarks are both detected, reaching a first conclusion concerning the object; and
if the first watermark is detected but not the second, reaching a second, different, conclusion concerning the object.

14. The method of claim 11, wherein the security document comprises a photo identification document.

15. The method of claim 11, wherein the security document comprises a passport.

16. The method of claim 14, wherein the security document comprises a financial instrument.

17. A method of authenticating the security document of claim 11 comprising:
receiving optical scan data associated with at least a portion of the security document;
analyzing the optical scan data to determine the authentication clue; and
determining authenticity of the security document based on the authentication clue.

18. A security document comprising:
a substrate; and
printing on the substrate,
wherein the printing comprises at least a first digital watermark and a
second digital watermark in a predetermined relationship, and
wherein the first digital watermark and the second digital watermark comprise the predetermined relationship to help enable authentication of the security document.

19. A method of authenticating the security document of claim 18, comprising:
receiving optical scan data associated with at least a portion of the security document;
analyzing the optical scan data to determine whether the first and second watermarks comprise the predetermined relationship; and
if the watermarks do not comprise the predetermined relationship, determining that the security document is not authentic.

20. A method of authenticating the security document of claim 18, comprising:
receiving optical scan data associated with at least a portion of the security document;
analyzing the optical scan data to determine whether the first and second watermarks comprise the predetermined relationship; and
if the watermarks comprise the predetermined relationship, determining that the security document is authentic.

21. The method of claim 18, wherein the security document comprises a photo identification document.

22. The method of claim 18, wherein the security document comprises a passport.

23. The method of claim 18, wherein the security document comprises a financial instrument.

24. The security document of claim 18, wherein the, predetermined relationship comprises the first digital watermark being designed to withstand a predetermined process, and the second digital watermark being designed to not withstand such predetermined process, and wherein the predetermined process comprises at least one of scanning and printing.

25. The method of claim 1 wherein the first watermark comprises a private watermark.

26. The method of claim 25 wherein the second watermark comprises a public watermark.

27. The method of claim 4 wherein the first watermark information comprises private watermark information.

28. The method of claim 27 wherein the second watermark information comprises public watermark information.

29. The method of claim 11 wherein the first watermark comprises a private watermark.

30. The method of claim 29 wherein the second watermark comprises a public watermark.

* * * * *

UNITED STATES PATENT AND TRADEMARK OFFICE
CERTIFICATE OF CORRECTION

PATENT NO.       : 7,054,462 B2                                          Page 1 of 1
APPLICATION NO.  : 10/112647
DATED            : May 30, 2006
INVENTOR(S)      : Geoffrey B. Rhoads and Ammon E. Gustafson It is certified that error appears in the above-identified patent and that said Letters Patent is hereby corrected as shown below:

On the face of the Patent, under Item 60, Related U.S. Application Data, please delete lines 1-17 of Item 60, and insert the following in its place:

(60)  --Division of application No. 09/498,223, filed February 3, 2000, now Pat. No. 6,574,350, which is a continuation-in-part of application No. 09/287,940, filed April 7, 1999, now Pat. No. 6,580,819, and a continuation of application No. 09/433,104, filed November 3, 1999, now Pat. No. 6,636,615, which is a continuation-in-part of application No. 09/234,780 filed on January 20, 1999, now abandoned. The present application is also a continuation-in-part of application No. 09/998,763, filed November 29, 2001, now Pat. No. 6,738,495, which is a continuation-in-part of application No. 09/442,440, filed November 17, 1999, now Pat. No. 6,542,618, which is a continuation of application No. 08/951,858, filed on October 16, 1997, now Pat. No. 6,026,193, which is a continuation of application No. 08/436,134, filed May 8, 1995, now Pat. No. 5,748,763.--.

Col 7, claim 6, line 1:

Delete the word "meted" and replace with the word "method".

Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,054,462 B2  Page 1 of 1
APPLICATION NO. : 10/112647
DATED : May 30, 2006
INVENTOR(S) : Geoffrey B. Rhoads and Ammon E. Gustafson It is certified that error appears in the above-identified patent and that said Letters Patent is hereby corrected as shown below:

On the face of the Patent, under Item 60, Related U.S. Application Data, please delete lines 1-17 of Item 60, and insert the following in its place:

(60) --Division of application No. 09/498,223, filed February 3, 2000, now Pat. No. 6,574,350, which is a continuation-in-part of application No. 09/287,940, filed April 7, 1999, now Pat. No. 6,580,819, and a continuation of application No. 09/433,104, filed November 3, 1999, now Pat. No. 6,636,615, which is a continuation-in-part of application No. 09/234,780 filed on January 20, 1999, now abandoned. The present application is also a continuation-in-part of application No. 09/998,763, filed November 29, 2001, now Pat. No. 6,738,495, which is a continuation-in-part of application No. 09/442,440, filed November 17, 1999, now Pat. No. 6,542,618, which is a continuation of application No. 08/951,858, filed on October 16, 1997, now Pat. No. 6,026,193, which is a continuation of application No. 08/436,134, filed May 8, 1995, now Pat. No. 5,748,763.--.

<u>Column 7, line 10 (claim 6, line 1)</u>

Delete the word "meted" and replace with the word "method".

This certificate supersedes the Certificate of Correction issued May 17, 2011.

Signed and Sealed this
Twenty-first Day of June, 2011

David J. Kappos
*Director of the United States Patent and Trademark Office*